Patented May 22, 1945

2,376,499

UNITED STATES PATENT OFFICE 2,376,499

SOAP AND METHOD OF PRODUCING

Paul R. Mosher, Wilmington, Del., assignor to Hercules Powder Company, Wilmington, Del., a corporation of Delaware No Drawing. Application April 27, 1942, Serial No. 440,724

4 Claims. (Cl. 252—367)

This invention relates to improved soaps and to a method for their production, and more particularly to improved powdered soaps and to a method for their production.

Powdered soaps have been produced by a spray process involving spraying hot liquid soap into a tower where the drops of liquid soap contact an upward current of dry warm air, or by a spray process involving spraying hot liquid soap into a vacuum chamber. Granules of soap are obtained by the former process, whereas the vacuum process provides beads of soap. The soaps which have been processed to provide powdered soaps have been prepared by saponifying tallow, lard, olive oil, palm oil, coconut oil, cottonseed oil, soybean oil, etc. Builders, such as sodium carbonate, sodium silicate, trisodium phosphate, borax, etc., were also added to the liquid soap, if the properties imparted by these builders were desired in the final product. Powdered soaps prepared from these materials according to the processes mentioned above have found wide use for both household and commercial purposes because they are conveniently handled, and because of other obvious reasons. Rosin in saponified form has been used to a limited extent in yellow laundry bar soaps, but has not been used in powdered soaps presumably because of such deterring factors as caking due to moisture absorption in humid atmospheres, stickiness, discoloration of the product, odor, and tendency to spontaneous combustion.

Now, in accordance with this invention, a powdered soap, which contains a substantial proportion of saponified rosin and which is free from the above-mentioned disadvantages associated with the use of rosin in soap, has been prepared. It has been found that a highly desirable powdered soap is obtainable by utilizing saponified rosin in conjunction with saponified fats, oils, fatty acids, etc., to an extent from about 10 to about 25%, and preferably from about 15 to about 20%, of the dry powdered soap. Thus, the powdered soaps of this invention comprise a reaction product of a caustic alkali and a rosin and at least about 35% of a reaction product of a caustic alkali and a fat, an oil, and/or a fatty acid on the basis of the dry powdered soap, the remainder, if any, of the dry powdered soap comprising a builder. The powdered soaps containing a saponified rosin will contain not in excess of about 13% moisture on the basis of the dry soap.

The new method of this invention comprises discharging at a temperature between about 200 and about 325° F. and a pressure between about 40 and about 300 lbs. per sq. in. drops of the hot liquid soap (having the composition on a dry basis stated in the previous paragraph and having a total water content between about 43 and about 67% on a dry basis) into an atmosphere adapted to remove sufficient moisture from the liquid drops to produce the soap in powdered form having a water content not greater than about 13% on a dry basis. Thus, by spraying a liquid soap of the defined composition in accordance with the method of this invention, there is produced a highly satisfactory product which does not suffer from the disadvantages formerly associated with the use of rosin in powdered soaps.

The powdered soaps of the above compositions prepared in accordance with this invention are characterized by many excellent and highly desirable properties. Thus, the powdered soaps are highly soluble in both hot and cold water, and exhibit excellent resistance to reversion, particularly when subjected to the action of warm atmospheres which are relatively saturated with respect to moisture.

Having thus indicated in a general way the nature of this invention, the following examples are given to illustrate the method for preparing these improved powdered soaps. In the specification and in the claims, the terms "parts," "proportions" and "percentages" are by weight, unless otherwise indicated.

*Example 1*

The apparatus employed in this example comprised an autoclave, in which the liquid soap was heated, and a spray tower in which a spray processed soap was prepared. A full-boiled soap was made by successively saponifying with a slight excess of sodium hydroxide 1500 parts of high grade beef tallow, 500 parts of coconut oil and 355 parts of a polymerized rosin obtained by polymerization of rosin with sulfuric acid and having a drop melting point of 98° C. and an acid number of 145. This full-boiled soap, containing approximately 47% water on a dry basis, was charged to an autoclave in which the soap was heated with stirring until it has attained a temperature of about 300–320° F. At this temperature, the liquid soap developed a steam pressure of about 75–90 lbs. per sq. in. The soap was then sprayed into a tower by being subjected to a pressure of about 250 lbs. per sq. in. with nitrogen gas. In order to do this, the soap was forced by the pressure of the nitrogen through a needle valve and then through a steam heated pipe to the spray tower, where it was sprayed through a nozzle comprising a pipe cap which was drilled with a No. 68 drill (0.031 in. diameter). In this spray tower, the drying air at a temperature of about 240° F. was passed in an upward spiral countercurrent to the drops of soap. By following this procedure, a spray processed soap containing the equivalent of about 15% of rosin soap on a dry basis was produced. The soap granules were mainly about 0.020 inch in diameter, were white in color, free flowing and non-reverting, and had a moisture content of about four per cent on a dry basis.

*Example 2*

A full-boiled soap was made by successively saponifying with a slight excess of sodium hydroxide 1500 parts of high grade beef tallow, 500 parts of coconut oil and 434 parts of the polymerized rosin used in Example 1. Nine hundred ten parts of the neat soap were crutched with 227 parts of 35% sodium silicate of 1:3 sodium oxide:silicon dioxide content and 29 parts of anhydrous sodium carbonate. This soap, containing about 47% of moisture on a dry basis, was prepared into a spray processed soap using the procedure of Example 1. Again, the soap granules were mainly about 0.020 inch in diameter, were white in color, free flowing and non-reverting, and had a moisture content of about nine per cent on a dry basis.

*Example 3*

A full-boiled soap was made by successively saponifying with a small excess of sodium hydroxide 1500 parts of high grade beef tallow, 500 parts of coconut oil and 355 parts of a hydrogenated rosin which was 65% saturated. The neat soap, containing about 47% of water on a dry basis, was subjected to the spray treatment described in Example 1. The product contained about 15% rosin soap on a dry basis and was white in color, free flowing, non-reverting, and had a moisture content of about three per cent on a dry basis.

*Example 4*

A full-boiled soap was made by successively saponifying with a small excess of caustic soda 1500 parts of high grade beef tallow, 500 parts of coconut oil and 434 parts of a hydrogenated rosin which was about 65% saturated. In a crutcher, 910 parts of this soap were crutched with 227 parts of 35% solids sodium silicate of 1:3 sodium oxide:silicon dioxide content and 29 parts of anhydrous sodium carbonate. This soap, containing 47% of moisture on a dry basis, was spray dried according to the procedure described in Example 1. The product was a filled soap powder which was white in color, free flowing, non-reverting, and had a moisture content of about five per cent on a dry basis.

*Example 5*

A full-boiled soap was made by successively saponifying with a slight excess of sodium hydroxide 1500 parts of high grade beef tallow, 500 parts of coconut oil and 355 parts of pure dehydroabietic acid. The neat soap, containing about 47% of moisture on a dry basis, was spray dried as in Example 1 to produce a soap containing the equivalent of about 15% of rosin soap on a dry basis, which was white in color, free flowing, non-reverting, and had a moisture content of about five per cent on a dry basis.

*Example 6*

A full-boiled soap was made by successively saponifying with a small excess of caustic soda 1500 parts of high grade beef tallow, 500 parts of coconut oil and 355 parts of crystallized rosin acids, which were prepared by crystallization from a solution of N wood rosin and ethyl alcohol. These crystallized rosin acids had an acid number of about 183 and a Lovibond color of 6 Amber. The neat soap, containing about 47% of water on a dry basis, was prepared into soap granules using the procedure described in Example 1 to yield a product containing the equivalent of 15% rosin soap on a dry basis. This soap was white in color, free flowing, non-reverting, and had a moisture content of about four per cent on a dry basis.

*Example 7*

A full-boiled soap was made by successively saponifying with a small excess of sodium hydroxide 1500 parts of high grade beef tallow, 500 parts of coconut oil and 434 parts of crystallized rosin acids having an acid number of 182 and a Lovibond color of 6 Amber, which were prepared by crystallization from a solution of N wood rosin and ethyl alcohol. Nine hundred ten parts of the neat soap were crutched with 227 parts of 35% solids sodium silicate of 1:3 sodium oxide:silicon dioxide content and 29 parts of anhydrous sodium carbonate. The soap, containing 47% by weight of moisture on a dry basis, was spray dried as in Example 1 to produce a filled soap powder which was white in color, free flowing, non-reverting, and had a moisture content of about seven per cent on a dry basis.

*Example 8*

A full-boiled soap was made by successively saponifying with a small excess of caustic soda 1500 parts of high grade beef tallow, 500 parts of coconut oil and 355 parts of H gum rosin having an acid number of 168. The neat soap, containing 47% moisture on a dry basis, was made into soap granules according to the procedure described in Example 1. The product contained the equivalent of 15% of rosin soap on a dry basis, was white in color, free flowing, non-reverting, and has a moisture content of about one per cent on a dry basis.

*Example 9*

A full-boiled soap was prepared by successively saponifying with a small excess of sodium hydroxide 1500 parts of high grade beef tallow, 500 parts of coconut oil and 434 parts of H gum rosin having an acid number of 168. Nine hundred ten parts of neat soap were crutched with 227 parts of 35% solids sodium silicate of 1:3 sodium oxide:silicon dioxide content and 29 parts of sodium carbonate. The soap mixture, containing about 47% of water on a dry basis, was charged into the spray drier by the procedure described in Example 1. The product was a filled soap powder which was white in color, free flowing, non-reverting, and had a moisture content of about eight per cent on a dry basis.

*Example 10*

A full-boiled soap was made by successively saponifying with a small excess of sodium hydroxide 1500 parts of high grade beef tallow, 500 parts of coconut oil and 355 parts of WG wood rosin having an acid number of 167 and a drop melting point of 85° C. The neat soap, containing 47% moisture on a dry basis, was made into soap granules according to the spray drying procedure described in Example 1. The product, containing 15% of rosin soap on a dry basis, was white in color, free flowing, non-reverting, and had a moisture content of about one per cent on a dry basis.

Example 11

A full-boiled soap was made by successively saponifying with a small excess of caustic soda 1500 parts of high grade beef tallow, 500 parts of coconut oil and 435 parts of the WG wood rosin employed in Example 10. Nine hundred ten parts of the neat soap were crutched with 227 parts of 35% solids sodium silicate of 1:3 sodium oxide: silicon dioxide content and 29 parts of anhydrous sodium carbonate. This soap mixture, containing about 47% of water on a dry basis, was sprayed dried according to the procedure described in Example 1. The product was a filled soap powder which was white in color, free flowing, non-reverting, and had a moisture content of about four per cent on a dry basis.

Example 12

A full-boiled soap was made by successively saponifying with a small excess of sodium hydroxide 1500 parts of high grade beef tallow, 500 parts of coconut oil and 355 parts of N wood rosin having an acid number of 166 and a drop melting point of 85° C. The neat soap, containing about 47% moisture on a dry basis, was made into soap granules according to the procedure described in Example 1. The product contained 15% of rosin soap on a dry basis, was white in color, free flowing, non-reverting, and had a moisture content of about one per cent on a dry basis.

Example 13

A full-boiled soap was made by successively saponifying with a small excess of caustic soda 1500 parts of beef tallow, 500 parts of coconut oil, and 355 parts of K wood rosin having an acid number of 166 and a drop melting point of 82° C. The neat soap, containing about 47% moisture on a dry basis, was made into soap granules according to the procedure described in Example 1. The product contained 15% of rosin soap on a dry basis, was white in color, free flowing, non-reverting, and had a moisture content of about one per cent on a dry basis.

Examples 14

A full-boiled soap was made by successively saponifying with a slight excess of caustic soda 1500 parts of high grade beef tallow, 500 parts of coconut oil and 434 parts of K wood rosin having an acid number of 166 and a drop melting point of 82° C. Nine hundred ten parts of the neat soap were crutched with 227 parts of 35% solids sodium silicate of 1:3 sodium oxide:silicon dioxide content and 29 parts of sodium carbonate. The soap mixture, containing about 47% of water on a dry basis, was charged into the spray drier by the procedure described in Example 1. The product was a filled soap powder which was white in color, free flowing, non-reverting and had a moisture content of about four per cent on a dry basis.

Example 15

A full-boiled soap was made by successively saponifying with a small excess of sodium hydroxide 1500 parts of high grade beef tallow, 500 parts of coconut oil and 355 parts of isomerized rosin (isomerized using a palladium on carbon catalyst and having a color of WG, an acid number of 162, an optical rotation of 55°, and a bromine number of 42). The neat soap, containing 47% moisture on a dry basis, was prepared into soap granules by the procedure described in Example 1. The product contained 15% rosin soap on a dry basis, was white in color, free flowing, non-reverting, and had a moisture content of about two per cent on a dry basis.

Example 16

A full-boiled soap was made by successively saponifying with a small excess of caustic soda 1500 parts of high grade beef tallow, 500 parts of coconut oil and 434 parts of the isomerized wood rosin employed in Example 15. Nine hundred ten parts of the neat soap were crutched with 227 parts of 35% solids sodium silicate of 1:3 sodium oxide:silicon dioxide content and 29 parts of anhydrous sodium carbonate. The soap mixture, containing about 47% moisture on a dry basis, was spray dried according to the procedure described in Example 1. The product was a filled soap powder which was white in color, free flowing, non-reverting, and had a moisture content of about five per cent on a dry basis.

The above examples illustrate that the powdered soaps of this invention may be prepared by successively saponifying a fat, an oil, and a rosin. Alternatively, the soaps may be prepared by adding partially or wholly saponified rosin to a soap prepared from a fat, an oil, or a fatty acid, and they may be prepared by simultaneously saponifying the fat and/or oil and rosin. Furthermore, the soap may be prepared by the semi-boiled and cold processes, as well as the full-boiled process employed in the examples. Other variations in the methods for preparing the soaps containing saponified rosin will be evident to those skilled in the soapmaking art.

These powdered soaps may be obtained using any wood or gum rosin, or the pure rosin acids contained therein, such as abietic acid, sapinic acid, pimaric acid, etc. Any of the commercial grades of wood rosin may be utilized in place of the WG, the N, and the K wood rosins employed in Examples 10, 11, 12, 13 and 14.

Examples 6 and 7 show the preparation of the powdered soaps from crystallized rosin acids prepared by crystallization from a solution of N wood rosin in ethyl alcohol. Crystallized rosin acids which may also be used may be prepared by crystallization from a solution of wood rosin in isopropyl alcohol, acetone, etc., and also according to the method described in an application by Richard F. B. Cox, Serial No. 385,415, filed March 27, 1941 now issued as Patent No. 2,296,503 of September 22, 1942.

In Examples 1 and 2, the spray processed soaps were prepared by the use of polymerized rosins obtained by polymerization of rosin with sulfuric acid. The polymerized rosins which may be employed may be produced from wood or gum rosin or the rosin acids contained therein by polymerization according to any of the known methods, such as by treatment with various catalysts as sulfuric acid, organic substituted sulfuric acids, boron fluoride, metallic halides as zinc chloride, aluminum chloride, hydrofluoric acid, or by treatment of the material with a high voltage, high frequency electric discharge, or by treatment with an acid sludge formed from rosin and sulfuric acid as described in an application of Clell E.

Tyler, Serial No. 328,864, filed April 10, 1940 now issued as Patent No. 2,288,659 of July 7, 1942. These polymerized rosins will usually have an acid number above about 100 and a drop melting point from about 90 to about 135° C.

Examples 3 and 4 show the preparation of the improved soap powders from hydrogenated rosins. Suitable hydrogenated rosins may be prepared according to procedures well known in the art by contacting a wood or gum rosin or the rosin acids contained therein with hydrogen and a suitable hydrogenation catalyst, such as Raney nickel, platinum, palladium, etc. Preferably, a hydrogenated rosin which is saturated to at least about 50% of the theoretical saturation is employed in order to product products of the most desirable properties, although rosins which are saturated to a less extent may also be employed. The hydrogenated rosin used will generally have an acid number above about 100.

Desirable spray processed powdered soaps may also be prepared from rosin which has been subjected to a conventional heat treatment, such as a treatment of the rosin at 250–350° C. for a period of time sufficient to produce substantial isomerization. As shown in Examples 15 and 16, the rosins which have been catalytically treated to produce substantial isomerization according to the method described in U. S. Patent No. 2,154,629, issued April 18, 1939 to E. R. Littman, or to similar methods employing iodine or sulfur isomerization catalysts, may also be employed in the preparation of desirable powdered soaps.

The examples illustrate the preparation of the improved soaps of this invention from beef tallow and coconut oil. In their place, there may be used any of the fats or oily glycerides employed in the soap-making industry, such as mutton tallow, lard, palm kernel oil, kernel oil, palm oil, babassu oil, corn oil, cottonseed oil, grease, fish oils, whale oil, soybean oil, olive oil, peanut oil, linseed oil, castor oil, foots of vegetable oils, etc. The fatty acids containing at least 12 carbon atoms obtainable from any of the aforementioned oils may also be employed, such as stearic, palmitic, oleic, myristic, etc. acids. In the examples, the soaps were prepared by using sodium hydroxide to saponify the rosin, tallow, and coconut oil. Potassium hydroxide, and mixtures of potassium hydroxide and sodium hydroxide may also be employed to saponify the rosin and other saponifiable materials.

As shown in Examples 2, 4, 7, 9, 11, 14, and 16, these powdered soaps may also contain the builders usually employed in the soap industry. In these examples, sodium silicate and anhydrous sodium carbonate were employed. Other builders, such as sodium borate, trisodium phosphate, sodium perborate, sand, volcanic ash, infusorial earth, pumice, clay, starch, colloidal clays, colloidal silicates, talc, Bentonite, silex, zinc oxide, titanium oxide, methyl cellulose, sodium metasilicate, sodium orthosilicate, colloidal organic materials, and the other builders generally employed in the soap industry are suitable for use in the preparation of the improved powdered soaps. Perfumes and coloring materials may also be added, depending upon the particular properties desired in the soap products.

These powdered soaps may be prepared using the equipment generally employed in the preparation of powdered soaps. In the examples, the powdered soaps were prepared by a spray drying process in which the liquid soap had a water content of about 47% before being sprayed. When a spray drying procedure of this type is utilized, the preferable water content will depend upon the composition of the soap and upon the other operating conditions, and the liquid soap being fed to the spraying means may contain between about 43 and about 67% of water on a dry basis, including the water of crystallization of any builders which may be present in the soap composition. Also, the examples show that the soap was heated to a temperature of 300–320° F. before being sprayed, and was sprayed under a pressure of about 250 lbs. per sq. in. Again, these conditions are not limiting ones, and the most desirable temperature and pressure for spraying will depend upon the particular soap being sprayed, upon the design of the means of spraying, upon the design of the spray tower, upon the rate of flow of drying air, upon the temperature and humidity conditions of the drying air, and upon other factors evident to those skilled in the art. Thus, the liquid soap may be fed to the spraying means at a temperature between about 200 and about 325° F. and under a pressure between about 40 and about 300 lbs. per sq. in. The means of spraying employed may be any of the devices generally employed in the art, such as pressure-atomizing nozzles or mechanical sprays such as the centrifugal sprayers. In the examples, the drops of liquid soap were dried with air having a temperature of about 240° F. Any other atmosphere, such as nitrogen, may be employed as the drying medium. The temperature which will be found to be most suitable in actual practice may vary within wide limits and will depend upon factors such as those which determine the most desirable temperature and pressure of the soap being fed to the means for spraying and upon other factors. Hence, the drying atmosphere may have a temperature between about 200 and about 500° F. and generally a relative humidity between about 20 and about 70%. In the examples, the drying air was passed countercurrent to the flow of the drops of liquid soap. Drying may also be accomplished by parallel flow, or by a combination of countercurrent and parallel flow. The moisture content and other properties of the finished spray processed powdered soap may be adjusted by varying the moisture content of the liquid hot soap, by varying the temperature and pressure of the liquid soap being sprayed, by varying the rate of flow of the drying air, by changing the temperature and humidity conditions of the drying air by means of air conditioning equipment, and by other methods evident to those acquainted with the procedures for the preparation of spray processed soaps. The finished powdered soap will have a water content not greater than about 13% on a dry basis, to yield products free from the disadvantages generally associated with the use of rosin in powdered soaps. Highly desirable powdered soaps may also be prepared by spraying the liquid soap into a vacuum chamber in accordance with procedures well known in the art, or by grinding a solidified soap of the requisite composition by means of the equipment generally employed in the art.

Thus, by preparing a powdered soap containing the ingredients described in this specification, useful and highly desirable cleansing agents, which possess many valuable characteristics and do not suffer from the defects generally connected with the use of rosin in powdered soaps, are produced. Thus, these soaps are very soluble in both hot and cold water, and give excellent lathers. Also, the presence of the saponified rosin in the powdered soaps imparts to the soaps valuable cleansing and detergent properties. Furthermore, the particles of soap are extremely stable and exhibit little tendency to revert even when subjected to warm atmospheres having a high relative humidity. These powdered soaps containing saponified rosing prepared as described herein do not tend to absorb moisture and become sticky, and hence they are free flowing under all the temperature and humidity conditions which may be encountered in actual practice. In addition, the powdered soaps are characterized by remarkable uniformity of particle size, so that there are no larger lumps which will delay rapid solution of the powder in water. Moreover, the soaps of this invention are free from odor, and the rosin soap is a fixative for perfumes which may be added to the soap. When certain types of rosin are used, such as crystallized rosin acids, isomerized rosins, or hydrogenated rosins, soaps of extremely light color and excellent color stability are produced.

What I claim and desire to protect by Letters Patent is:

1. The method of producing a spray processed powdered soap which comprises discharging at a temperature between about 200 and about 325° F. and a pressure between about 40 and about 300 lbs. per sq. in. drops of liquid soap comprising a reaction product of a caustic alkali and a rosin and a reaction product of a caustic alkali and a material selected from the group consisting of fats, oils, and fatty acids, said liquid soap having a total moisture content between about 43 and about 67% on a dry basis, into an atmosphere having a temperature between about 200 and about 500° F. under conditions adapted to remove sufficient moisture from the liquid drops to produce the soap in powdered form and having a moisture content not greater than about 13% on the basis of the dry soap.

2. The method of producing a spray processed powdered soap which comprises discharging at a temperature between about 200 and about 325° F. and a pressure between about 40 and about 300 lbs. per sq. in. drops of liquid soap comprising a reaction product of a caustic alkali and a polymerized rosin and a reaction product of a caustic alkali and a material selected from the group consisting of fats, oils, and fatty acids, said liquid soap having a total moisture content between about 43 and about 67% on a dry basis, into an atmosphere having a temperature between about 200 and about 500° F. under conditions adapted to remove sufficient moisture from the liquid drops to produce the soap in powdered form and having a moisture content not greater than about 13% on the basis of the dry soap.

3. The method of producing a spray processed powdered soap which comprises discharging at a temperature between about 200 and about 325° F. and a pressure between about 40 and about 300 lbs. per sq. in. drops of liquid soap comprising a reaction product of a caustic alkali and a hydrogenated rosin and a reaction product of a caustic alkali and a material selected from the group consisting of fats, oils, and fatty acids, said liquid soap having a total moisture content between about 43 and about 67% on a dry basis, into an atmosphere having a temperature between about 200 and about 500° F. under conditions adapted to remove sufficient moisture from the liquid drops to produce the soap in powdered form and having a moisture content not greater than about 13% on the basis of the dry soap.

4. The method of producing a spray processed powdered soap which comprises discharging at a temperature between about 200 and about 325° F. and a pressure between about 40 and about 300 lbs. per sq. in. drops of liquid soap comprising a reaction product of a caustic alkali and a rosin which has been heat treated to produce substantial isomerization and a reaction product of a caustic alkali and a material selected from the group consisting of fats, oils, and fatty acids, said liquid soap having a total moisture content between about 43 and about 67% on a dry basis, into an atmosphere having a temperature between about 200 and about 500° F. under conditions adapted to remove sufficient moisture from the liquid drops to produce the soap in powdered form and having a moisture content not greater than about 13% on the basis of the dry soap.

PAUL R. MOSHER.